US010649744B1

(12) United States Patent
Black et al.

(10) Patent No.: US 10,649,744 B1
(45) Date of Patent: May 12, 2020

(54) SYSTEMS AND METHODS FOR HANDLING RENAMING OF PROGRAMMING CONSTRUCTS IN PROGRAMMING ENVIRONMENTS

(71) Applicant: The MathWorks, Inc., Natick, MA (US)

(72) Inventors: Jennifer Black, Ashland, MA (US); Xiao Xu, Wellesley, MA (US); David Foti, Holliston, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 16/206,917

(22) Filed: Nov. 30, 2018

(51) Int. Cl.
| | | |
|---|---|---|
| *G06F 9/44* | (2018.01) |
| *G06F 8/36* | (2018.01) |
| *G06F 8/72* | (2018.01) |
| *G06F 8/41* | (2018.01) |
| *G06F 11/36* | (2006.01) |
| *G06F 8/75* | (2018.01) |

(52) U.S. Cl.
CPC .............. *G06F 8/36* (2013.01); *G06F 8/425* (2013.01); *G06F 8/427* (2013.01); *G06F 8/72* (2013.01); *G06F 8/75* (2013.01); *G06F 11/3612* (2013.01)

(58) Field of Classification Search
CPC ............................. G06F 8/36; G06F 8/71–77
USPC ........................................................ 717/108
See application file for complete search history.

(56) References Cited

U.S. PATENT DOCUMENTS

| | | | | |
|---|---|---|---|---|
| 6,415,435 B1 * | 7/2002 | McIntyre | .................. | G06F 8/76 717/108 |
| 7,178,141 B2 * | 2/2007 | Piazza | ...................... | G06F 8/63 717/168 |
| 8,418,163 B2 * | 4/2013 | Connolly | ............ | G06F 9/44552 713/100 |
| 8,468,506 B2 * | 6/2013 | Klein | ...................... | G06F 8/445 717/140 |
| 8,620,974 B2 * | 12/2013 | Stephenson | ......... | G06F 9/45533 707/825 |
| 8,627,282 B1 * | 1/2014 | Karr | ......................... | G06F 8/31 717/114 |
| 9,311,057 B2 * | 4/2016 | Brunel | ...................... | G06F 8/31 |
| 9,424,025 B2 * | 8/2016 | Ahmed | .................... | G06F 8/71 |

(Continued)

OTHER PUBLICATIONS

Miguel Garzon et al. "Reverse Engineering of Object-oriented Code into Umple Using an Incremental and Rule-based Approach"; Conference: Proceedings of 24th Annual International Conference on Computer Science and Software Engineering, at Markham, Ontario, Canada; Jan. 2014.*

(Continued)

*Primary Examiner* — Francisco J Aponte
(74) *Attorney, Agent, or Firm* — Wolf, Greenfield & Sacks, P.C.

(57) ABSTRACT

Apparatus and methods are described for adapting a programming environment to handle renamed programming constructs such as classes and packages. Non-canonical identifiers that reference renamed programming constructs can be used in code parts to be executed in the programming environment, and the code parts can execute, without disruption or user intervention, using related canonical identifiers. The solutions described herein provide backward and forward compatibility for code and data affected by renaming of programming constructs.

20 Claims, 5 Drawing Sheets

(56) References Cited

U.S. PATENT DOCUMENTS

| | | | | |
|---|---|---|---|---|
| 9,678,728 | B1* | 6/2017 | Shemer (Udi) et al. ................... G06F 8/443 |
| 10,061,573 | B2* | 8/2018 | Araya ...................... G06F 8/447 |
| 10,169,034 | B2* | 1/2019 | Ahmed ...................... G06F 8/71 |
| 2004/0154004 | A1* | 8/2004 | Maine ....................... G06F 8/51 |
| | | | | 717/136 |
| 2007/0083874 | A1* | 4/2007 | Vasudevan ............ H04N 1/603 |
| | | | | 719/328 |
| 2008/0016108 | A1* | 1/2008 | Aspinall .................... G06F 8/31 |
| 2009/0217020 | A1* | 8/2009 | Yourst ..................... G06F 9/383 |
| | | | | 712/245 |
| 2010/0088587 | A1* | 4/2010 | Ding .................... G06F 40/197 |
| | | | | 715/229 |
| 2011/0078674 | A1* | 3/2011 | Ershov ...................... G06F 8/75 |
| | | | | 717/170 |
| 2011/0138373 | A1* | 6/2011 | Lane ....................... G06F 8/443 |
| | | | | 717/157 |
| 2012/0005480 | A1* | 1/2012 | Batke .................... G06F 21/572 |
| | | | | 713/175 |
| 2015/0234642 | A1* | 8/2015 | Araya ....................... G06F 8/51 |
| | | | | 717/137 |

OTHER PUBLICATIONS

Christoph Kleine: "Backward and Forward Compatibility for TOSCA Simple Profile in YAML Version 1.0: Concept and Modelling Tooling"; Institute of Parallel and Distributed Systems University of Stuttgart Universitätsstraße 38 . May 3, 2017.*

Konrad Grochowski et al.: "Serialization in Object-Oriented Programming Languages"; Open Source Programming for Data Science and Machine Learning—Software Design and Modelling, Aug. 2019.*

* cited by examiner

US 10,649,744 B1

SYSTEMS AND METHODS FOR HANDLING RENAMING OF PROGRAMMING CONSTRUCTS IN PROGRAMMING ENVIRONMENTS

SUMMARY

Example embodiments described herein relate to methods and apparatus for providing backward and forward compatibility of code and/or data in programming environments, wherein programming constructs associated with the code and data have been or will be renamed. Example programming constructs can include, but are not limited to, classes, packages, functions, blocks, systems, and libraries. Embodiments described herein allow such operations as code execution, data load operations, serialization, and introspection on an object to execute without error, disruption in workflow, or user intervention, even though the operations can contain code parts and/or data that may use or have been created using an outdated identifier for a programming construct.

Some embodiments relate to methods of providing backward and forward compatibility of code or data that references a renamed programming construct. An example method can include acts of: detecting, by a processor of a computing system, a first mapping between one or more non-canonical identifiers for a programming construct and a canonical identifier for the programming construct, the first mapping being stored in source code, metadata associated with source code, or object code; parsing the first mapping generating an identifier map based at least in part on information parsed from the first mapping, wherein the identifier map includes at least the canonical identifier and associates the canonical identifier with the one or more non-canonical identifiers; at run-time of the code or load operation of the data, detecting an unknown referencing identifier for a programming construct; in response to detecting the unknown referencing identifier, accessing the identifier map; determining from the identifier map that a non-canonical identifier of the one or more non-canonical identifiers matches the unknown referencing identifier and is associated with the canonical identifier; and executing the code using the canonical identifier without entering an error state.

Some embodiments relate to a computing system that supports a programming environment. An example system can comprise at least one processor in communication with first memory and rapid access memory, code-execution components, an aliasing parser, and a path manager. The programming environment can be configured to: detect, by the aliasing parser, a first mapping between one or more non-canonical identifiers for a programming construct and a canonical identifier for the programming construct, the first mapping being stored in source code, metadata associated with source code, or object code in the first memory; parse, by the aliasing parser, the first mapping; generate an identifier map in the rapid access memory based at least in part on information parsed from the first mapping, wherein the identifier map includes at least the canonical identifier and associates the canonical identifier with the one or more non-canonical identifiers; at run-time of code or load operation of data in the programming environment, detect, by at least one of the code-execution components, an unknown referencing identifier for a programming construct; in response to detecting the unknown referencing identifier, initiate interrogation of the identifier map; identify from the identifier map that a non-canonical identifier of the one or more non-canonical identifiers matches the unknown referencing identifier and is associated with the canonical identifier; and execute, by the code-execution components, the code without entering an error state.

Some embodiments relate to computer-readable medium encoding code that, when executed by at least one processor of a computing system, adapt the at least one processor to: detect a mapping between one or more non-canonical identifiers for a programming construct and a canonical identifier for the programming construct, the mapping being stored in source code, metadata associated with source code, or object code; parse the mapping; generate an identifier map based at least in part on information parsed from the mapping, wherein the identifier map includes at least the canonical identifier and associates the canonical identifier with the one or more non-canonical identifiers; at run-time of code or load operation of data, detect an unknown referencing identifier for a programming construct; in response to detecting the unknown referencing identifier, access the identifier map; determine from the identifier map that a non-canonical identifier of the one or more non-canonical identifiers matches the unknown referencing identifier and is associated with the canonical identifier; and execute the code without entering an error state.

The foregoing summary is provided by way of illustration and is not intended to be limiting.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION

Figure 1:
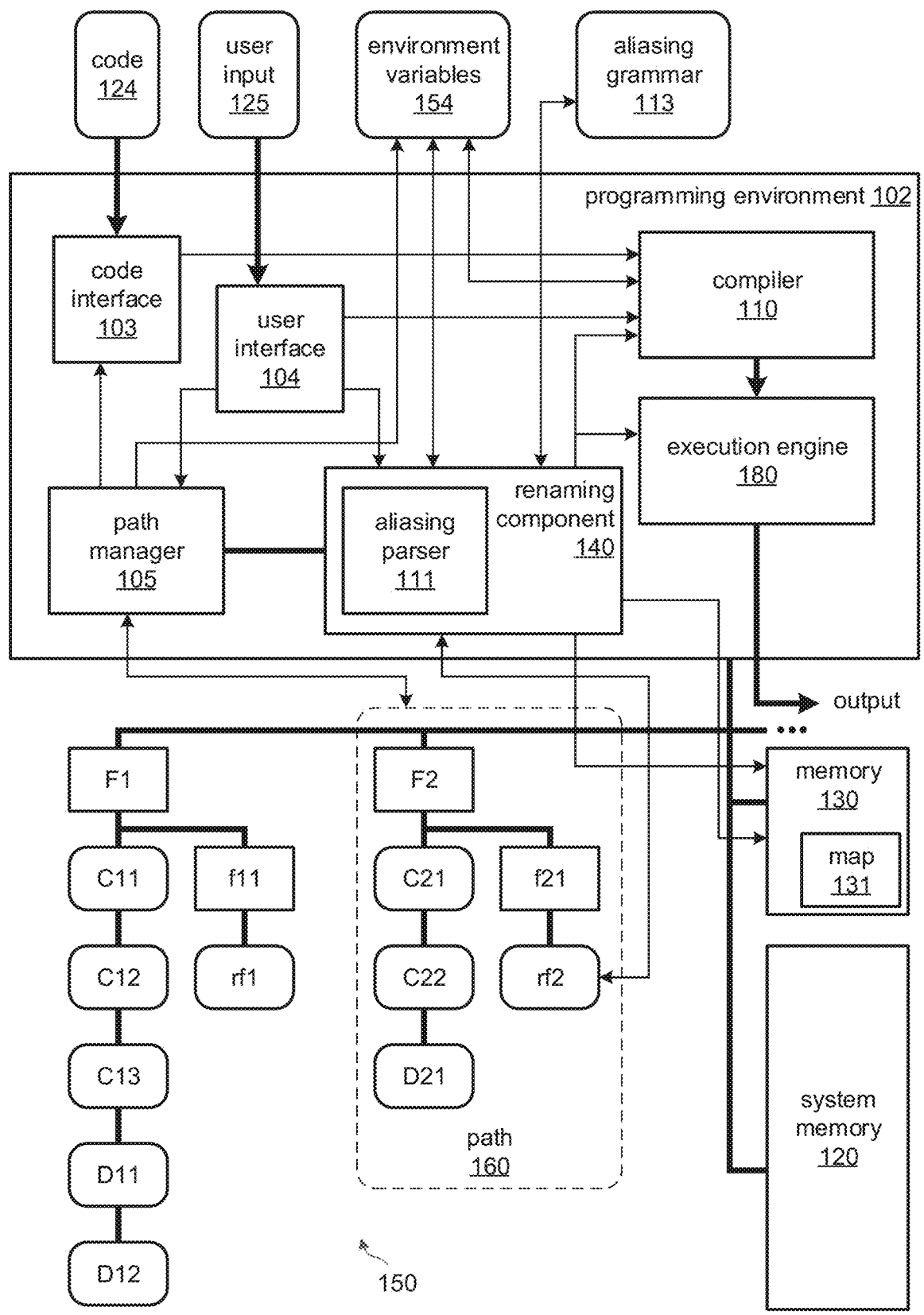
FIG. 1 illustrates an example programming environment and related components that support forward and backward compatibility for code and data associated with a renamed programming construct.

Some computer programming languages allow users to utilize programming constructs, such as classes and packages, to organize and facilitate the development of code. Other examples of programming constructs include, but are not limited to, functions, blocks, systems, and libraries. Such programming constructs can be referenced by an identifier (e.g., a name) in code that is executing on a system. Programming constructs can be used in different codes and by different users. For example, a programming construct can be produced by a first code author for a first code, and used by second code author for different code, and further used by an end user. In some cases, the code may be executed on one or more processors and perform technically advanced calculations based on received data (e.g., predictive modeling of weather systems, analyzing data to determine a genetic sequence, performing speech, image, or gesture recognition, etc.). In some cases, the code may be operating, or aiding in the operation of, complex electromechanical systems, such as code that assists in the operation of modern vehicles, wind turbines, airplanes, power grids, etc. Described herein are systems and methods for providing backward and forward compatibility for code and data that reference or have been created using programming constructs that have been renamed (re-identified) after the data was created or the code was originally written using previous identifiers for the programming constructs.

Renaming of programming constructs can occur for a variety of reasons. For example, a software company or organization may decide to formalize naming of classes and packages to improve uniformity, readability, and understanding of corresponding portions of code. As another example, a software company or organization may be acquired by or merged with a parent company or other organization (such as Oracle's acquisition of Sun Microsystems), and programming constructs of the software company may need to be renamed to follow a naming convention of the parent company or merged organization, or to reflect trade dress of the parent company or organization (e.g., include a commercially distinctive name or mark within each name). For example, a package having an initial identifier "math.pkg" may be renamed according to a naming standard as "Math.Oracle.pkg." In some cases, a code author (who could be a third-party vendor of code portions for a larger code base) may decide to rename a programming construct to avoid potential conflict or confusion with another name, to include a more descriptive name, or simply based on personal preference.

Regardless of the reason, renaming of a programming construct can be problematic for code that was or is prepared to reference a previous identifier for the programming construct. Renamings can also be problematic for data load operations and serialization that involve referencing a previous identifier for a programming construct. Executing the code or performing a load operation of the data based on an older identifier for the programming construct, for example, will lead to a run-time error and termination of an executing program for failure to locate a referenced programming construct (e.g., a class or package). Accordingly and as an example, existing instances of a class that have been stored in files using a former class identifier will not be usable after the class has been renamed in executable code. Conversely, a renamed class or serialized instance of a renamed class may not be referenced or loaded without error by an older version of code that predates the renaming. As a result, an unrecognized or unknown identifier for a programming construct can cause an unacceptable disruption in workflow in some cases (termination of executing code and issuance of an error), causing a user to manually intervene to correct the problem and re-execute or continue execution of the program. In some cases there is no work-around available for the end user and the result can be a loss of the user's ability to access data or previous instances of classes.

One approach to handling the renaming is to revise and update the affected code to reference the new identifiers of programming constructs, and then re-release the code as an updated version, for example. With such an approach, the revisions may require several iterations and recompilations before all bugs associated with the renaming are removed. Such an approach can be time intensive, expensive, and prone to human error for large code bases. For example, code for assisting in the operation of modern automobiles can contain millions of lines of code that is distributed among thousands of files and that executes on hundreds of processors in an automobile. Updating all affected code correctly in such a large code base to reflect all renamed programming constructs and recompiling the code can be an enormous and highly expensive undertaking. This approach may also fail to address problems associated with previously-created data and instantiations. Additionally, once updated, the code is bound to one identifier for each programming construct and would need further revisions and updates for subsequent renamings of programming constructs. Additionally, any new code that is to be authored or generated needs to conform to the renamed programming constructs. For example, a programmer needs to be made aware of and remember renamings of programming constructs. Also, existing software that generates code, such as Simulink®, needs to be updated for each renaming event. Tracking and accommodating renamings of program constructs can be burdensome and costly in some cases.

Some computing languages support static type definitions, which may be used to handle renaming of programming constructs. For example, the C++ programming language allows a code author to refer to a type using a nickname specified by a 'typedef' statement. In such cases, renaming of classes may require code authors to declare instructions for replacing a default name of a type, class, or package with a specified nickname. Such type definitions are static and apply at compile time. However, such an approach can be difficult to implement and maintain across a large codebase and can become complex and/or cumbersome with multiple renamings. Any language with dynamic type information and reflection will not be able to see the alternative names. For example, code may wish to ask if a class implements a particular interface name or is a subclass of a particular base class. Such a question can't be answered about an alternate name provided with typedef. Additionally, use of type definitions may not be suitable for tracking a programming construct as it is renamed multiple times over the course of several code versions, for example. Typedefs must be visible to all code relying on them. This means that old code using old names must include header files that define the typedefs for the new names. This approach doesn't work very well in languages that don't use preprocessors and header files. Further, type definitions can't necessarily help with use of names in data files, for example because the preprocessor that reads type definitions may not be involved in reading data. Also, the approach may not provide both forward and backward compatibility for code and/or data, because it may not support multiple renamings and may not provide true equivalency for operations such as introspection (e.g., "isa").

The inventors have recognized and appreciated that renaming of programming constructs can be handled in a way that does not require code that would be adversely affected by the renaming to be revised. The approach also does not require code authors or code generators to track and be aware of renamings of programming constructs. In an example approach conceived by the inventors, mapping information relevant to renamings of programming constructs is available to code-execution components (e.g., a compiler and/or execution engine) in the programming environment. The programming environment can support development and execution of code. The mapping information can associate a canonical identifier for a renamed programming construct with one or more non-canonical identifiers for the renamed programming construct. The mapping information can include data for all renamed programming constructs needed for execution of code affected by the renamed programming constructs. A canonical identifier can be a renamed and current identifier, publicly released by a software entity, company, or organization as a current identifier for a programming construct. A non-canonical identifier can be an outdated, deprecated, or former identifier for a programming construct.

In some implementations, the mapping information can be co-located with code defining the programming construct and placed in a designated place that may be invisible to downstream users. For example, the mapping information may be placed in a sub-folder or a resource folder that is not readily apparent or hidden from view to a user that enters a command to list the contents of a folder. Such mapping information can be parsed by the programming environment and accumulated into an identifier map data structure in memory (e.g., RAM) that is accessed by the programming environment when executing the code or code that references a renamed construct. Code-execution components in the programming environment can interrogate the identifier map to resolve references to renamed programming constructs. By using the apparatus and methods of the present embodiments, existing code (which may be field tested and free of bugs), existing object instantiations, and existing data can be used or loaded and execute normally even though they may reference one or more non-canonical identifiers. In some cases at least a portion of the identifier map can be written to cache memory, so that the code can execute at an apparently normal speed without exhibiting noticeable delays, which might otherwise occur when accessing an identifier map stored in non-volatile or volatile memory including RAM. Additionally, the present solutions can allow the code to execute and the data load operations to perform without entering or indicating an error state, without disruption of workflow, and without requiring user intervention during execution of code to resolve references to non-canonical identifiers.

The present embodiments also support incremental renaming in which a programming construct may be renamed multiple times. For example, a programming construct may undergo multiple renames as part of an incremental renaming strategy for a package and the classes it contains. First the class itself could be renamed, and then later the package could be renamed. The result is that the same class has had two different fully package-qualified identifiers. Further, the mapping information can be used in dependency analysis of programming constructs such as when deploying code to check whether the code is packaged correctly.

In addition to the above benefits, solutions to handling renaming of programming constructs described herein provide both forward and backward code compatibility and support multiple renamings of a same programming construct. Solutions described herein can avoid additions and revisions to an existing code base to support renamed programming constructs that may occur in code (e.g., a toolbox or library) used by the code base. Additions and revisions to an existing code base can increase the size and complexity of the source code and storage space required for the source code. Accordingly, the solutions described herein for handling renaming of programming constructs, support multiple renamings of a same programming construct, support forward and backward compatibility, require less complexity and storage space of code affected by the renamed programming constructs, and can operate at faster speeds than alternative solutions to handling the renaming of programming constructs.

In overview, example apparatus and methods of the present embodiments allow programming constructs, whether or not renamed, to be referenced in executing code and load operations in a programming environment using canonical and non-canonical identifiers. In some embodiments, the systems and methods can be implemented using at least one processor in communication with memory, an aliasing parser, mapping information, a path manager, and a modification to code-execution components in a programming environment, as explained in further detail below. For example, the aliasing parser, operating in a programming environment, can detect mapping information in memory that records one or more non-canonical identifiers and a related canonical identifier for a programming construct. The aliasing parser can be configured to parse the mapping information and generate an identifier map therefrom that, for each renamed programming construct, associates one or more non-canonical identifiers with a canonical identifier for the corresponding renamed programming construct. The resulting identifier map can include a plurality of canonical identifiers for different programming constructs and associated non-canonical identifiers. In some implementations, the mapping information can be retrieved from persistent and/or non-volatile storage. The identifier map can be stored in non-volatile or volatile memory. In some cases, at least a portion of the identifier map can be written to cache memory to allow for rapid access at run-time of the code. In some implementations, an identifier map can be specialized for one or more particular programming constructs such that the map is organized for efficiency. For example, classes can support subclassing and it may be possible to query whether one class is a subclass of another class. By including non-canonical identifiers in a list of superclasses for a class, it can be just as fast to query whether a class has a particular superclass using either the canonical superclass identifier or a non-canonical identifier for the superclass identifier.

At run-time, executing code or performing a load operation may reference a programming construct using a canonical or non-canonical identifier. For example, a user of a programming environment may have input or caused execution of a code part that instantiates a class using a non-canonical class identifier, or a code part may be received for execution by the programming environment that references a non-canonical class identifier. Detection, by the programming environment, of a reference to a non-canonical identifier or a failure to recognized the referencing identifier, can cause interrogation of the identifier map to identify a canonical identifier associated with the referenced non-canonical identifier. Using the canonical identifier, the programming environment can then execute the code or perform the load operation without error and without intervention required from a user.

Accordingly, preexisting code and/or instantiations using non-canonical identifiers to reference renamed programming constructs continue to work in newer software platforms such as newer programming environments, thereby providing backward compatibility for the newer software platforms that postdate the renaming of the programming constructs. Forward compatibility is also provided for older versions of programming environments. The older programming environment can use, with the aid of the mapping information, an old, non-canonical identifier in use prior to the renaming, which will allow newer code to run in older versions of programming environments, for example. This can be a significant benefit to users who may use multiple versions of a programming environment within a same company and share old and new code, for example.

In further detail and referring now to FIG. 1, an example system having a programming environment 102 is depicted that supports forward and backward compatibility for code and load operations that reference a renamed programming construct. The programming environment 102 can be implemented as software that executes on hardware of at least one processor that is in communication with one or more memory devices, such as system memory 120 and memory 130. The at least one processor may be in communication with other computer peripheral devices (e.g., display, keyboard, network interface card, etc.). In the illustration, boxes shown with rounded corners indicate information and/or data that can be passed to or accessed by the programming environment 102 and that can be stored on one or both of the memory devices 120, 130. To simplify the drawing, one or more processors on which the programming environment 102 executes are not shown in the drawing. Also illustrated in FIG. 1 is an example file system 150 that includes folders (or directories) F1, F2 that can be made accessible to the programming environment and an example path 160 (indicated by the dashed line) from which code and/or code parts 124 are currently accessible for execution by the programming environment 102.

In embodiments, system memory 120 can be any suitable persistent and/or non-volatile storage local or remote to programming environment 102. In some embodiments, system memory 120 can include a file system 150 implemented on one or more hard drives, solid state drives, and/or any suitable storage devices. System memory 120 can also include code files and data files. For example, system memory 120 can include code files C11, C12, C13 and data files D11, D12 that may be organized into and associated with a first folder F1. Similarly, system memory 120 can include code files and data files associated with other folders (e.g., F2) as well as code and data files associated with sub-folders (e.g., f11, f21). System memory 120 can store various additional files that are used by the programming environment, such as metadata files or folders in which mapping information is stored, environment variables 154, rules and/or aliasing grammar 113 for aliasing parser 111. Environment variables 154 can store any suitable variables related to programming environment 102. For example, environment variables 154 can store information about a file system 150 that defines a path which is defined for current access by the programming environment 102. In some embodiments, environment variables 154 can include information related to the state of code execution in the programming environment.

Memory 130 can comprise volatile or non-volatile memory that can be accessed by the programming environment more quickly than system memory 120. Examples of memory 130 include, but are not limited to, random access memory (RAM), high-speed static random access memory (SRAM), cache memory, or a combination thereof. Memory 130 can be integrated in a same chip as a processor on which all or part of programming environment executes, or can be located on a nearby chip having a dedicated bus connecting to the processor on which all or part of programming environment executes.

An example programming environment 102 adapted to implement the present embodiments can comprise at least a code interface 103 (which may be an application programming interface) configured to receive code for execution, a path manager 105 configured to determine where code for execution is located (e.g., identify which folders are currently designated as accessible for code execution), and an aliasing parser 111 for parsing mapping information. An example programming environment 102 can further include code-execution components, which can include a compiler 110 for compiling received code and an execution engine 180 for executing compiled code. In embodiments, a programming environment 102 can include functionalities to perform one or more of the following tasks: receive and execute code 124 via code interface 103, receive and store code written by a user (e.g., as part or all of a code file) for subsequent execution, launch and execute code files, edit code files, receive data, process data, generate data, store data, load data in conjunction with code execution, edit data files, and output results of code execution.

Example textual programming environments in which the present embodiments can be implemented are the MATLAB® and Simscape® programming environments available from The MathWorks, Inc., of Natick, Mass. An example graphical programming environment in which the present embodiments can be implemented is the Simulink® programming environment available from The MathWorks, Inc. However, the invention is not limited to the MATLAB®, Simscape®, or Simulink® programming environments, but can be applied to other programming environments such as programming environments associated with Python, Ruby, Julia, Mathematica, Labview, etc. that may utilize programming constructs and perform load operations that reference programming constructs. In some cases, a programming environment 102 may execute on a single processor or multi-core processors of a single computing device (e.g., personal computer, lap-top, smart phone, tablet computer, work station, etc.). In some implementations, a programming environment 102 may execute on distributed processors on separate computing devices (e.g., cluster of or networked computing devices, one or more servers, one or more servers and client, etc.).

Various types of code 124 and user input 125 can be received by the programming environment 102. Code 124 and user input 125 can include, but is not limited to, command-line instructions, data entry instructions, and conventional computing code prepared using a publicly known or proprietary programming language. Command-line instructions can include commands recognized by an operating system of the system on which the programming environment 102 is in operation. Example command-line instructions can include commands allowing a user to create and remove folders and files and navigate within the file system 150. Example command-line instructions can include commands for loading code file(s), loading data file(s) for access by the programming environment 102 and for initiating execution of the code file(s). Example command-line instructions can include commands for creating, instantiating, serializing, and performing introspection of programming constructs such as classes and packages. One example introspection function supported by the programming environment 102 is the "isa" function. Dynamic casts in C++ can also provide instrospection functionality. There can be a large number of different command-line instructions recognized by a programming environment 102, as would be appreciated by one skilled in the art of computer science. Data entry instructions can include data that is input by a user (e.g., inputting data values that are used by executing code) and/or input automatically from one or more sensors (e.g., sensors in a monitored environment or machine) and data load instructions that identify one or more data files to be used by executing code. Data entry instructions can include data generation (e.g., generating an array, sequence, or set of data) and data store instructions (e.g., storing generated data to one or more files for subsequent use by executing code).

As explained above, an executing code or performing a load operation in a programming environment 102 can cause an error condition when the code or loaded data, for example, references a programming construct (e.g., class or package) that has been renamed. As an example, a line of code in a toolbox that is used by a larger code base of the programming environment 102 may reference a class by name using a non-canonical identifier "Material Science" for the class:

obj1=MaterialScience;

After the toolbox code base was prepared, it may be decided to rename the class (for any of the above-mentioned reasons) for a new release of the larger code base to a currently canonical identifier "matsci_v1". As a result, a code-execution component, reflection system, or reflection library the programming environment 102 that is used to execute the code or load data created using the prior identifier "MaterialScience" may fail to locate the class definition, and compiling or execution of code would normally terminate. The programming environment 102 would then return an error message to the user to prompt the user to take manual action to resolve the problem.

One example solution for avoiding compilation errors or execution errors caused by renaming of a programming construct comprises three parts. A first part is to provide mapping information that is accessible to the programming environment 102 and that defines one or more relations, each relating being between one or more non-canonical identifiers and a canonical identifier that is currently used to reference the programming construct. The mapping can include relations for a plurality of different programming constructs, such as classes, packages, blocks, components, libraries, etc. A second part of the solution may comprise including an aliasing parser 111 in the programming environment 102 that can process the mapping information and produce an identifier map 131 that is stored in rapid access memory 130, for example. A third part is to modify operation of the programming environment 102 to first interrogate the identifier map 131 when determining that an identifier used to reference a programming construct is not a current, canonical identifier for a programming construct before issuing an error message or terminating compilation or execution of code 124 and using a canonical identifier from the identifier map 131 to continue execution of the code. By implementing these three parts, performance of the computing system can be improved from entering an error state and terminating compilation or execution of code when encountering a reference to a renamed programming construct to correctly referencing the renamed programming construct and continuing operation at an apparently normal speed without any required intervention by a user to correct the code or otherwise identify where the programming construct can be found.

Referring again to FIG. 1, mapping information can be embodied as relational information stored in source code, metadata associated with source code, or object code. The mapping information may have a specified format that associates one or more non-canonical identifiers with a canonical identifier for each programming construct represented in the mapping. For the example illustrated in FIG. 1, mappings for renamed programming constructs can be embodied as data files rf1, rf2. In some embodiments, a mapping is placed at a designated location that is identified as accessible to the programming environment 102, so that the programming environment can access the mapping when executing code that is affected by the mapping. In example embodiments, a mapping rf1 is co-located with the definitions in code of one or more programming constructs that has or have been renamed and that is or are represented in the mapping. For example, code files C11, C13 in a first folder F1 may be part of a toolbox and define five classes and two packages that have been renamed since the code was created. A code author can create a file rf1 containing the relevant mapping information and co-locate the file with the code containing the class and package definitions. In embodiments, a code author can provide user input 125 to the programming environment and enter mapping information to create files rf1, rf2, etc. containing mapping information via a user interface 104. The file(s) can provide canonical identifiers for one or more non-canonical identifiers that were previously used for the five classes and two packages.

In some cases, a file rf1 can be located in a same folder as the code that defines programming constructs that have been renamed according to mapping information contained in the file. In some implementations, a file rf1 can be located in a sub-folder f11 of a directory that contains the code. In some implementations, the mapping information can be included in another file or folder (e.g., a resource folder or a metadata folder) that is co-located with the code defining programming constructs that have been renamed according to mapping information. In some embodiments, the file rf1 or folder in which the mapping is located can be a hidden file or folder that is not normally visible to an end user.

Embodiments are not limited to having the mapping information provided in a separate file from the code defining programming constructs that have been renamed according to mapping information. In some implementations, the mapping information can be embodied as metadata associated with code (e.g., placed in a header file for C code) or placed as a header, code portion, or comments within the code itself. In some cases, the mapping information can be provided as object code that is co-located with the code defining programming constructs that have been renamed according to mapping information.

Figures 2, 3:
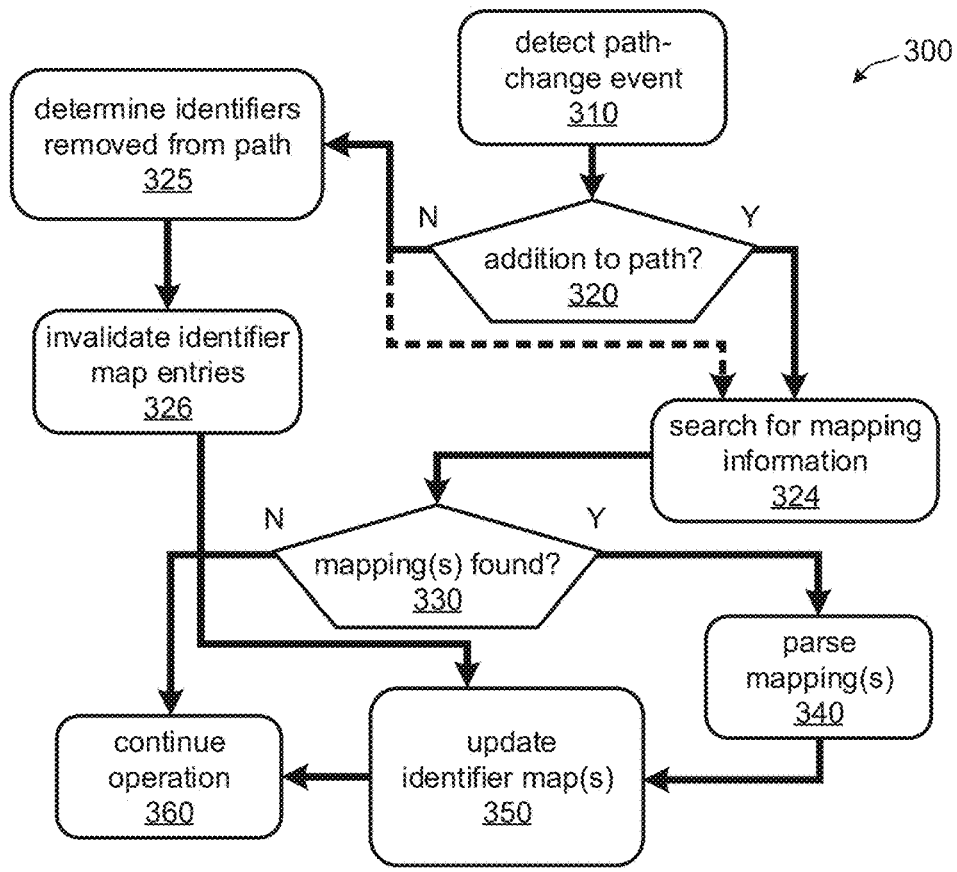
FIG. 2 depicts an example of mapping information, according to some embodiments.
FIG. 3 illustrates an example method relating to parsing, activating, and deactivating mapping information.

An example mapping 200 is depicted in FIG. 2. An identifier map 131 may include mapping information as depicted in FIG. 2. A mapping 200 can comprise a plurality of renaming entries 210-214, 220-222 that associate currently-used canonical identifiers with former non-canonical identifiers of programming constructs. In the illustrated embodiment, a canonical identifier 245 appears to the right of one or more related, former and now non-canonical identifiers 241, but the order may be reversed in some embodiments. A canonical identifier 245 can be the identifier that the programming environment 102 is configured to use at a particular point in time (e.g., the most recently defined identifier for a programming construct). In some cases, the arrangement of identifiers can indicate a chronological ordering of the identifiers, e.g., oldest identifier located furthest left or furthest right in a sequence of identifiers and the remaining identifiers arranged in a chronologically ordered sequence from the oldest to most recent based on their first use dates. In some embodiments, identifiers can represent a package and/or a class within the package. In further embodiments, identifiers can represent multiple classes and/or packages, and can be represented hierarchically in the mapping 200.

In some implementations, a mapping 200 (e.g., rf1, rf2) can be read by an aliasing parser 111 of the programming environment 102 and presented as displayed information to a code author by the programming environment 102 each time the code author renames a programming construct. In some implementations, a code author may enter mapping information for a mapping 200 as user input 125 via a user interface 104, and the programming environment can receive the entered mapping information (e.g., using the renaming component 140) to generate one or more mappings 200 that are associated with code relevant to the renamings included in the mappings 200. In some cases, a code author or the programming environment can delete intermediate identifiers from a mapping 200, such that the mapping contains only the oldest identifier and the canonical identifier.

In some embodiments, one or more identifier relational symbols 243 can be used to indicate a relation between a canonical identifier 245 and one or more non-canonical identifiers 241. In such embodiments, a relational symbol 243 can be expressed as any suitable symbol and/or as a positioning of the identifiers. For example, non-canonical identifier(s) 241 can appear on the left of canonical identifier 245. As a further example, a white space, symbol (such as a comma, colon, '→' etc.), and/or any other suitable symbol, can separate non-canonical identifier(s) 241 and a related canonical identifier 245. In some cases, a relational symbol 243 can indicate the chronological ordering of the identifiers in the mapping 200. For example, relational symbols can include a numbering that indicates a chronological order of each identifier in a list.

In some cases, the renaming entries 210-214, 220-222 may be grouped by type of programming construct, as depicted in FIG. 2. For example, renamed classes may be included in a first group of renaming entries 210-214, and renamed packages may be included in a second group of renaming entries 220-222. Renamed function may be included in a third group, etc.

Text, symbols, and/or format used in the mapping 200 can be interpreted by aliasing parser 111, with the aid of aliasing grammar 113, to determine meaning from the entries. The aliasing parser 111 can comprise code that executes and references aliasing grammar 113 to retrieve and implement rules related to the text, symbols, and/or format used in the mapping 200, so that the aliasing parser can determine the meaning of mapping entries and identify a canonical identifier for a programming construct that may have one or more non-canonical identifiers. For example, in the illustrated embodiment the symbol sequence "→" can be interpreted by the aliasing parser 111 to indicate a renaming of a programming construct from a former name, occurring in the mapping 200 immediately before the symbol sequence (omitting white spaces) to a related subsequently-used identifier (appearing to the right of the symbol sequence) for referencing the programming construct. The aliasing parser may further determine that an end identifier in an entry (e.g., farthest right, or appearing before a semicolon) is a canonical identifier.

In some implementations, a chronological order of identifiers used for renaming a programming construct multiple times may be reflected in the mapping 200, as in the first entry 210. For example, a next-used identifier for a programming construct can appear immediately to the right of the symbol sequence (e.g., "→") that immediately follows an immediate previously-used identifier for the construct. In the illustrated example, a non-canonical identifier 241b "Aold2Cl" in mapping 200 can be interpreted by the aliasing parser 111 as a more recent canonical identifier, at one time, than an oldest non-canonical identifier 241a and also as a non-canonical identifier for the currently canonical identifier "AnewC1".

In some embodiments, the order of entries 210-214, 220-222 in the mapping 200 has no importance and the entries can appear in any order. In some cases, the order of entries 210-214, 220-222 may reflect a chronology of when the programming constructs were renamed. For example, the most recently renamed programming construct may appear at a top of a list of entries followed by the next most recently renamed construct, etc., to provide a code author with a historical view of renamings. In some cases, the entries may be arranged alphabetically according to the oldest, non-canonical identifier or current canonical identifier to aid a code author in locating a renamed programming construct. Other formats for renaming entries can be used in other embodiments, wherein for at least one renaming entry a canonical identifier for a renamed programming construct is associated with at least one non-canonical identifier for the programming construct.

In some cases, the mapping 200 can be delineated to include a renaming body 205 and configuration information 255. The renaming body can include renaming entries 210-214, 220-222 that can be recognized, by aliasing parser 111 for example, when the mapping information is located in a file, in a header, or with other information or code. For example, a renaming body 205 can begin with a distinctive declaration ("renamedef" in this example) and end with an closing declaration (e.g., "end") or symbol. The renaming body 205 can then be recognized by an aliasing parser 111 from other information contained within a file, for example.

In some implementations, configuration information 255 can be included as additional information in a mapping 200. Configuration information 255 can be used to indicate actions that the programming environment 102 shall or shall not undertake in response to detecting a use of one or more non-canonical identifiers 241 in the mapping 200. For example, the configuration information ("notifyflag" in this example) when set to a first value (e.g., "true") can trigger the programming environment 102 to issue a message to a user when a non-canonical and/or canonical identifier is used, or when set to a second value (e.g., "false") to not issue a message. In some embodiments, configuration information 255 can further indicate the frequency with which the programming environment outputs the message. For example, the message can be output never, only once at the first use of the identifier, or each time use of an identifier is detected. In some cases, enumerations N can be used to identify a frequency with which the programming environment outputs the message (e.g., 0=never, 1=only once, 2=after each detection).

Aliasing parser 111 can be implemented as code that adapts hardware (e.g., machine-readable code produced from software code) to execute particular functionalities relating to locating and parsing mapping information relevant to renamed programming constructs. During run-time operation when a user interacts with the programming environment 102 to develop and/or run code, an aliasing parser 111 can interrogate one or more mappings 200 that are accessible to the programming environment 102 (on path 160, at a designated location, or otherwise accessible for code execution through a resource folder containing a toolbox, for example) and accumulate the mapping information into an identifier map 131 that can be created and stored in rapid access memory 130, according to some embodiments. In some implementations, the aliasing parser 111 can search accessible locations for mapping information by looking for a file (e.g., rf2) having a particular name, name portion, or extension that identifies the file as containing mapping information. The aliasing parser 111 can access the file, read the contents, and interpret the entries using rules and/or definitions from an aliasing grammar file 113, for example.

An identifier map 131 can have other suitable forms (e.g., a look-up table, data structure with pointer references to canonical identifiers, chart, etc.) that are different from the mapping 200 described in connection with FIG. 2. In a pointer reference format for example, each non-canonical identifier appearing in the data structure may be followed by a pointer that references the related canonical identifier for the renamed construct. In some implementations, an identifier map comprises a file or data structure having a same format as shown in FIG. 2 and may contain many more renaming entries than illustrated. In some implementations, at least a portion of an identifier map 131 can be written to cache memory to provide more rapid access to renaming entries and avoid slowdowns that might otherwise occur when resolving a renamed programming construct to a canonical identifier.

In some cases, an aliasing parser 111 may be configured to create, edit, and/or delete an identifier map based on certain conditions that occur during a user's interaction with the programming environment 102. In some implementations, conditions that cause the aliasing parser 111 to take an action can be reflected in environment variables 154. For example, if code defining a renamed construct goes off a path 160 or is no longer accessible to the programming environment 102 (which may be detected by the path manager 105 and indicated in environment variables 154), then the aliasing parser 111 may be activated to delete the associated entry for the renamed construct so that stale mapping information does not affect subsequent identifier resolution that could include new mapping information having a same identifier as used for the renamed construct that went off the path. As another example, an aliasing parser 111 can be activated to create or edit an identifier map 131 based on detection of a path-change event (e.g., start-up, addition or removal of a folder to a path 160, navigating to a new folder, etc.) or addition of new code to a folder currently on a path 160 which may be detected by a path manager 105 and recorded as environment variables 154. In some cases, an aliasing parser 111 can be activated when code 124 or user input 125 is received satisfying certain conditions (e.g., the code or input includes creation of a new class, renaming of an existing class, deletion of an existing class).

Some programming environments, such as the MAT-LAB® programming environment, support a "path" from which code is executed. An example path 160 is illustrated in FIG. 1. According to some embodiments, a path defines a set of locations where code and/or data resides that are made accessible for execution by the programming environment 102. In some systems, a folder (or directory) to which a user has navigated makes the contents of that folder accessible to the programming environment and is implicitly on the path. In some systems, a working path is defined, additionally or alternatively, by identifying the location of code and/or data to be used for execution. Some programming environments 102 can allow directories and/or folders and files in other directories to be added to and removed from a path via explicit instructions, such as a command-line instruction. For example and referring to FIG. 1, the instruction "addpath C:\F1" or "addpath(F1)" may make folder F1 and its contents accessible to code-execution components in the programming environment 102. When other folders and files are added to a path, the programming environment 102 can locate and access code and data located in the added folders and files. When a folder is removed (e.g., "rmpath C:\F1"), code-execution components in the programming environment 102 cannot locate and access code and data located in the removed folder. Changes in the programming environment 102 such as path change, folder additions, folder removals can be detected by the path manager 105 and prompt storage or updating of environment variables 154 that indicate a state of the programming environment 102 and/or transitions in the state of the programming environment 102. Transitions in the state of the programming environment 102 relating to path changes can trigger activation of the aliasing parser 111 to create, edit, and/or delete at least one identifier map 131 in memory 130.

As mentioned above, an aspect of handling renamed programming constructs relates to a modification of the programming environment 102 to interrogate the identifier map 131 when determining that an identifier used to reference a programming construct is not a canonical identifier for a programming construct, e.g., before or without issuing an error message and terminating execution of code 124. An example way to implement this aspect is to add one or more renaming application components 140 to the programming environment, referring again to FIG. 1, or to add its functionality to an existing code-execution component (e.g., an existing API used during code execution). A renaming component 140 can be implemented as code (e.g., machine-readable code produced from software code) that adapts hardware (e.g., logic circuitry) to execute particular functionalities at run-time relating to receipt, by at least one code-execution component, of code that references a programming construct using a non-canonical identifier.

In some embodiments, a renaming component is adapted to respond to requests from at least one code-execution component (e.g., a compiler 110, an execution engine 180, a precompiler, a preprocessor) when the code-execution component encounters an identifier (a non-canonical identifier) for a renamed programming construct that cannot be located by the code-execution component. In such embodiments, the renaming component 140 may receive a throw, exception, or returned error indicating that a programming construct cannot be located for a referencing identifier (a now non-canonical identifier). In response, the renaming component 140 or an agent acting for the renaming component can interrogate at least one identifier map 131 in memory 130 to determine whether the referencing identifier is registered in the identifier map as a non-canonical identifier and a canonical identifier exists for the non-canonical identifier. The renaming component 140 may then return the canonical identifier to the code-execution component so that the code-execution component can redirect its search for and locate the referenced programming construct. In some cases, a code-execution component may be modified to issue a specialized throw, exception, or error (that more readily triggers interrogation of the identifier map 131, for example) when encountering identifiers referencing programming constructs that cannot be located using the identifier.

As an example of the foregoing configuration of a renaming component, an execution engine 180 may receive code that references a class named "Foo" which has been renamed to "Bar." The execution engine 180 may return a specialized error indicating failure to locate the referenced class (e.g., "class location error: Foo"). The renaming component 140 may receive the error, search the identifier map 131 using the indicated identifier "Foo", and determine that "Foo" has been renamed to "Bar." The renaming component 140 can then return "Bar" to execution engine 180 that then searches for the class using the canonical identifier "Bar."

In alternative implementations, a renaming component 140 may be adapted to parse received code to determine whether the received code includes or causes a reference using a non-canonical identifier. For example, the renaming component 140 may query the identifier map 131 for each received identifier referencing a programming construct to determine whether the received identifier matches a non-canonical identifier in the identifier map. If a match is found, the renaming component 140 may replace the received, non-canonical identifier with a corresponding canonical identifier in the received code. For example, received code may include an instruction "obj1=Foo;" where class "Foo" has been renamed to "Bar." The renaming component 140 may locate the canonical identifier "Bar" in the identifier map 131 and replace the non-canonical identifier "Foo" in the instruction with the canonical identifier: "obj1=Bar;".

Example methods of handling renamings of programming constructs in a programming environment 102 will now be described. A first example method 300 for parsing, activating, and deactivating mapping information 200 is illustrated in the flow diagram of FIG. 3. In some implementations of method 300, a path manager 105 may detect (act 310) a path-change event (e.g., adding or removing one or more folders from a path 160, installing new code on a path and using it, navigating to a new folder, etc.) and may update environment variables 154 and/or issue a signal indicating that a path change event has occurred. The update or issued signal may activate aliasing parser 111. In some cases, the path manager 105, or aliasing parser 111, may determine (act 320) whether the path-change event is due to an addition of one or more folders and/or files to the current path or removal of one or more folders and/or files from the path. If the path-change event is due to an addition to the path, aliasing parser 111 can search for mapping information (act 324) that may have been added to the current path (e.g., co-located with code and/or data in a folder added to the current path) or co-located with code and/or data in a new path. In some cases, the aliasing parser 111 may be configured to search only the locations and/or code newly added to the path in response to a path change events representing additions to the path.

If the path-change event is not due to an addition to the path, then aliasing parser 111 can determine (act 325) which identifiers (canonical and their related non-canonical identifiers) for programming constructs are to be removed from memory 130. In some cases, the determination can be made by interrogating environment variables 154 or analyzing information received from the path manager 105 that identifies removal of one or more folders and/or files from the path. In some cases, the determination of which identifiers to remove from memory 130 can be made by analyzing code parts received from code interface 103 that cause the deletion of one or more programming constructs.

Operation of the programming environment 102 can then proceed with invalidating (act 326) entries in the identifier map 131 corresponding to the identifiers that have been determined (act 325) to be removed from memory 130. In some implementations, invalidation 326 of the identifiers may be performed by deleting each renaming entry in an identifier map 131 having an identifier that was determined (act 325) to be removed from memory 130. In some cases, invalidation 326 can comprise commenting out each renaming entry in an identifier map 131 having an identifier that was determined (act 325) to be removed from memory 130.

Method 300 may then continue with updating (act 350) any affected identifier map 131 (e.g., rewriting a revised identifier map 131 to storage) and continuing (act 360) operation of the programming environment 102.

Alternatively in some cases responding to a removal from the path, invalidation 326 of the identifiers may not be performed by revising an existing identifier map 131. Instead, method 300 may reparse all mapping information on the path and replace (e.g., overwrite) a previous identifier map 131. For example, method 300 may continue from act 320 by searching (act 324) for all mapping information on the current path 160, and creating at least one new identifier map 131 to replace at least one prior identifier map in memory 130. In such cases, acts 325 and 326 may not be performed.

Referring again to determining (act 320) that there has been an addition to the path in FIG. 3, a method 300 may continue with searching (act 324) for mapping information in one or more folders accessible on the path. If it is determined (act 330) that at least one mapping 200 is found, aliasing parser 111 can parse (act 340) the mapping information to identify one or more renamings of programming constructs. The act of parsing may utilize information from aliasing grammar 113 to interpret renaming entries in each mapping 200. When parsing a mapping 200, aliasing parser 111, for example, can identify one or more non-canonical identifiers that are associated with each canonical identifier, so that the relation(s) can be represented in at least one identifier map 131 (e.g., in non-canonical/canonical identifier pairs or non-canonical identifier/pointer pairs). Additionally in some cases, aliasing parser 111 can identify a chronological order associated with multiple renamings of a programming construct in a renaming entry, and represent the chronological order in an identifier map 131 (e.g., in an ordered or numbered sequence), in some embodiments.

After parsing (act 340) the mapping(s) 200, aliasing parser 111 can generate or update (act 350) at least one identifier map 131 in rapid access memory 130, for example. In some embodiments, the act of updating (act 350) identifier maps comprises appending new renaming entries to renaming entries already in a single identifier map 131. In some embodiments, the act of updating (act 350) identifier maps comprises creating and storing at least one identifier map 131 that accumulates all mapping information found located folders, files, objects, etc. currently accessible to code-execution components of the programming environment 102. The programming environment 102 can then continue operation (act 360). If the aliasing parser 111 does not locate mapping information after searching (act 324) all accessible locations, the programming environment 102 can continue operation (act 360).

According to some embodiments, the example method 300 illustrated in FIG. 3 can be initiated at start-up of a programming environment 102, for example, and execute a few times or many times during operation of the programming environment, depending upon a number of path-change events. Accordingly, the method 300 may execute few or many times during a user session with the programming environment. In some implementations, the method executes in the background, such that a user is unaware that method 300 is executing. By implementing a method such as the one described in FIG. 3, a computing system can be made aware of and prepared in part to handle renamed programming constructs so that code can run without execution error and user intervention that would otherwise occur when code-execution components (e.g., execution engine

180 or compiler 110) encounter an identifier for a renamed programming construct for which it cannot locate the programming construct.

Although the foregoing description in connection with FIG. 3 describes automated triggering of an aliasing parser 111 to generate and/or update an identifier map 131, other implementations are also possible. In some cases, a code author may, additionally or alternatively, manually update an identifier map 131 via the user interface 104.

Figure 4A:
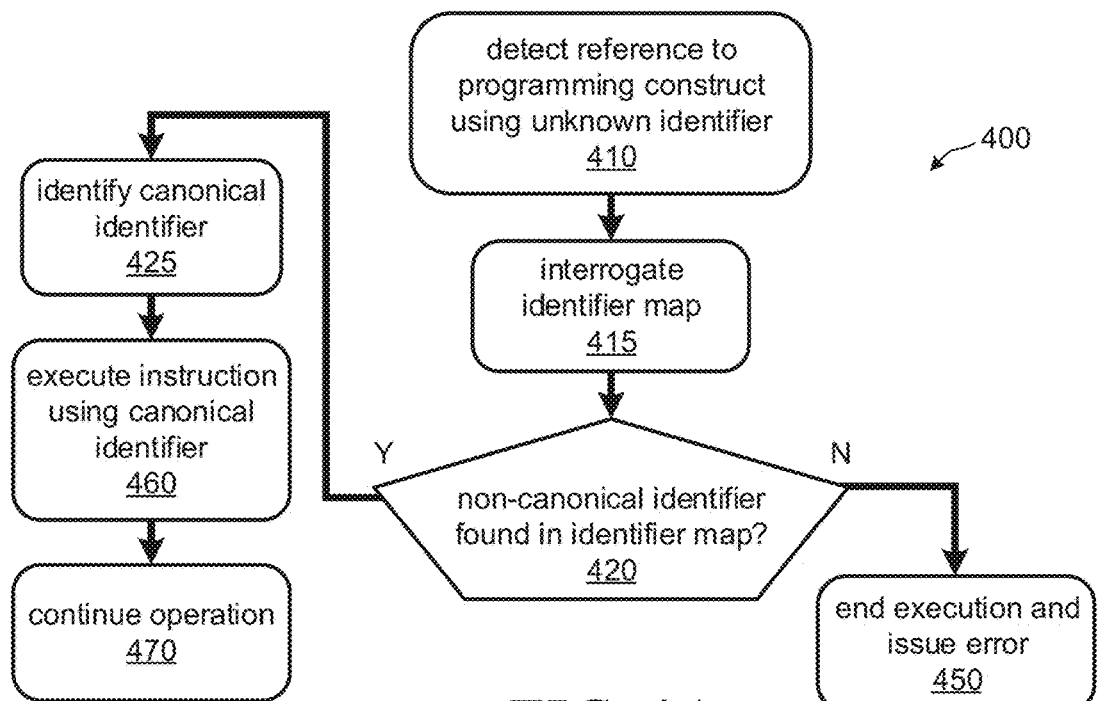
FIG. 4A illustrates an example method relating to identifying and selecting a related canonical identifier for an unknown identifier, according to some embodiments.
Figure 4B:
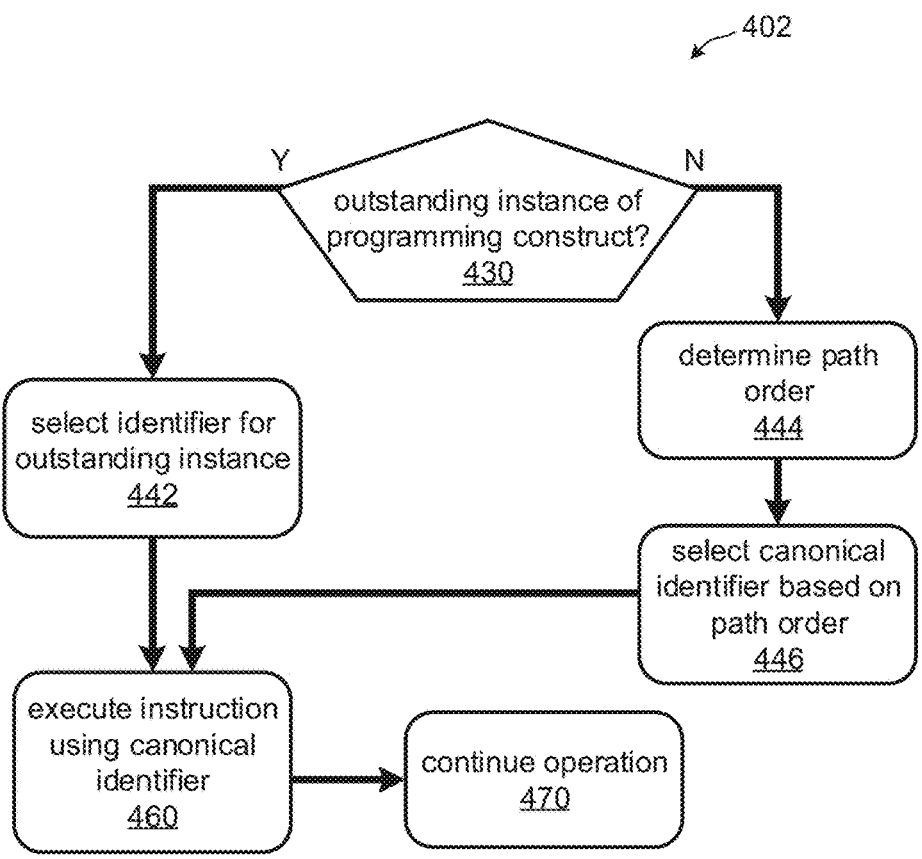
FIG. 4B illustrates an example method for handling duplicate identifiers for different programming constructs, according to some embodiments.
Figure 5:
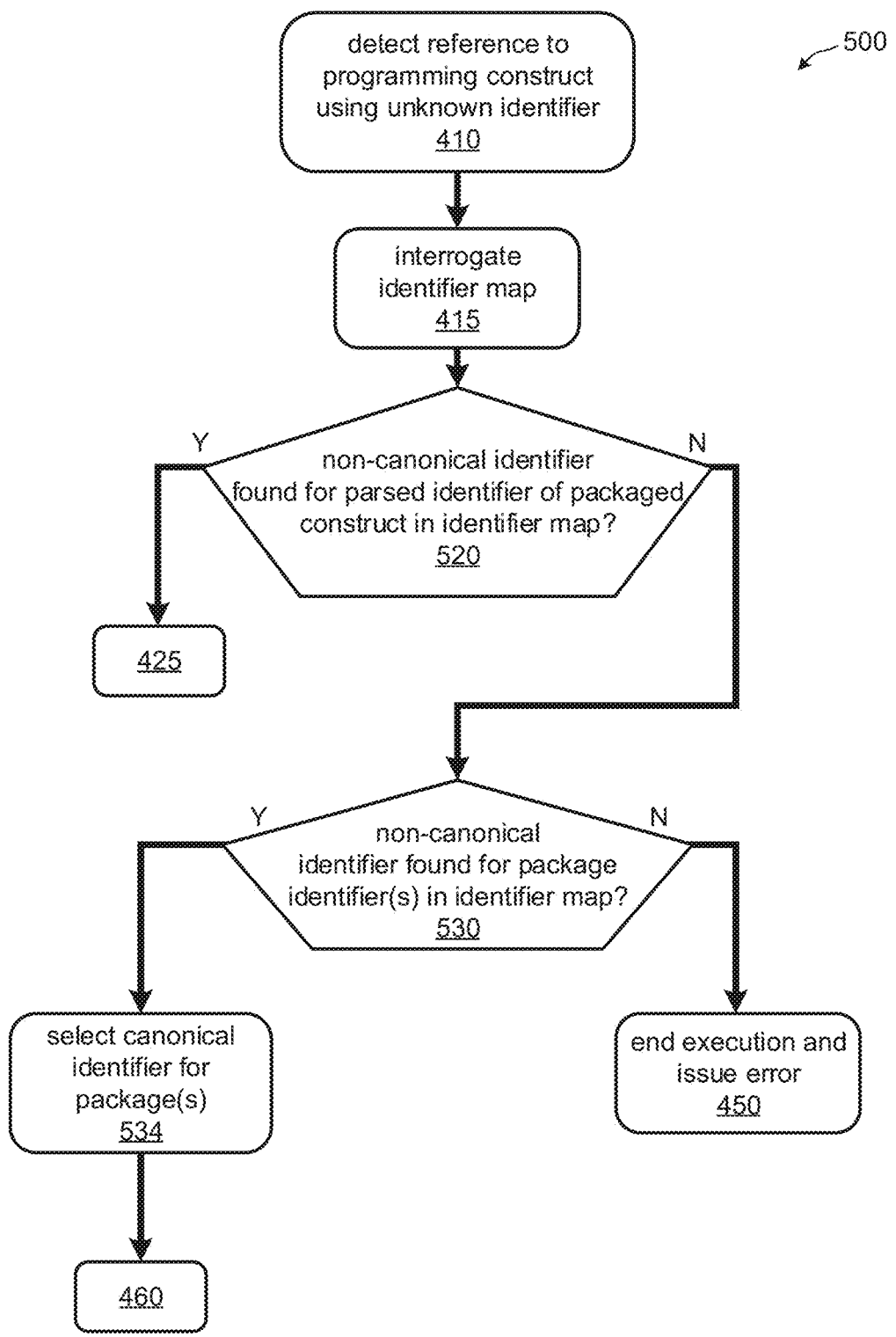
FIG. 5 illustrates an example method relating to identifying and selecting a related canonical identifier for an unknown identifier for one or more packages or a packaged programming construct, according to some embodiments.

Although some acts in method 300 of FIG. 3, method 400 of FIG. 4, and method 500 of FIG. 5 below are ascribed to certain components of the programming environment 102 for explanation purposes (e.g., ascribed to aliasing parser 111 and path manager 105), the ascribed acts may be handled, at least in part or alternatively, by one or more application programming interfaces in some implementations. For example, path manager 105 and aliasing parser 111 may instead interface with an API that performs at least some of the acts relating to detecting path-change events and interrogating identifier map(s) 131.

An example method 400 for resolving identifiers for renamed programming constructs is depicted in the flow chart of FIG. 4. Method 400 can be performed by a programming environment 102 described above in connection with FIG. 1, for example. During operation of a programming environment 102, a code-execution component may detect (act 410), in a code part to be executed, a reference to a programming construct by an unknown identifier or name (an identifier for which a programming construct cannot be located when the code-execution component uses the identifier to search for the identified programming construct). In response to detecting the unknown identifier, interrogation (act 415) of at least one identifier map 131 in memory 130 can be initiated (e.g., by renaming component 140 as described above). For example, an identifier map 131 can be interrogated using the unknown referencing identifier.

As a result of interrogating (act 415) an identifier maps 131, it can be determined (act 420) whether at least one non-canonical identifier in an identifier map matches the unknown referencing identifier. If no matching non-canonical identifier is found in the identifier map, then the programming environment 102 may terminate (act 450) executing or compiling code and issue a conventional error message. Such a result may occur if a referencing identifier is misspelled or refers to a programming construct that has not been defined.

If it is determined (act 420) that the unknown identifier matches a non-canonical identifier in the identifier map 131, method 400 may proceed to identifying (act 425) from the identifier map 131 a canonical identifier associated with the matching non-canonical identifier to the unknown referencing identifier. The identified canonical identifier can then be used to execute (act 460) code that contained the unknown identifier. For example, the canonical identifier can be passed to a code-execution component that searches for the corresponding programming construct. Normal operation of the programming environment 102 can then continue (act 470) without entering an error state.

In some embodiments, it can be possible that duplicate referencing identifiers can be in use at run-time in a programming environment 102 for two different programming constructs and the code-execution components must determine which of the two programming constructs should be referenced. Referring again to FIG. 1, such a scenario can occur for example, when a user adds a folder (e.g., F1) to a path 160 that includes mapping information renaming a non-canonical identifier (e.g., "oldclass→newclass") for a first programming construct, wherein the non-canonical identifier "oldclass" is already defined for a second programming construct in a folder F2 on the path 160. Accordingly, a method 402 in FIG. 4B may be implemented by a code-execution component in the programming environment 102 for resolving references to duplicate identifiers (or replica identifiers if more than two). When replica identifiers are detected, identifier resolution can be based on instantiation and/or path order. In some implementations, instantiation may take precedence over path order or code creation date.

According to some embodiments, a method 402 may begin by determining (act 430) whether there is an outstanding instance of a programming construct referenced by a canonical or one or more non-canonical identifiers that are replicas of each other. In some embodiments, outstanding instances of programming constructs (such as classes or packages) can be recorded and maintained in environment variables 154. If it is determined that there is an outstanding instance of a programming construct referenced by one of the replica canonical or non-canonical identifiers, then the identifier for the instantiated programming construct can be selected (act 442) for subsequent execution (act 460) of code. In some implementations, when replica identifiers are in use, the programming environment 102 may create distinguishing identifiers for each replica internally to distinguish between the corresponding programming constructs.

In some cases, path order can be defined by the time at which a folder is added to a path 160, for example. For example, if folder F1 in FIG. 1 were added to path 160 after folder F2, then a programming environment 102 may be configured to recognize folder F1 and its contents as having higher precedence on the path than folder F2 and its contents. The "path order" could then be described as F1>F2. However, a reverse precedence may be used in other embodiments. In some implementations, precedence for path order may be based on creation dates or modification dates of folders and/or their contents. Path order information can be stored and maintained in environment variables 154, for example.

According to some embodiments, regardless of how precedence is defined, if it is determined (act 430) that there is no outstanding instance of a programming construct corresponding to one of the replica identifiers, then path order for the identifiers can be determined (act 444) by a code-execution component or renaming component 140. For example, a code-execution component may determine when each identifier and/or its corresponding programming construct was made accessible to the path 160. Once path order has been determined, a canonical identifier can be selected (act 446) based on path order. For the example described above in which an identifier "oldclass" can appear as both a non-canonical identifier and canonical identifier on a path, the canonical identifier "newclass" can be selected (act 446) if the path order is F1>F2. Once a canonical identifier has been selected (act 446), control can proceed to executing (act 460) the code part and continuing (act 470) operation of the programming environment 102 without entering an error state.

Handling renamed packages can be more challenging than handling renamed classes, because packages can be nested, contain other programming constructs such as classes, and there can be renaming at any level within a package hierarchy. An example method 500 for handling renamed packages is depicted in FIG. 5. The method 500 can be performed by a programming environment 102 described above in connection with FIG. 1, for example. In some cases, a package can define a namespace for the classes and functions within the package. In some embodiments, packages can include one or more other packages.

In some implementations, an identifier for a package can be represented as a hierarchical package name, which structures identifiers of packages and sub-packages into a hierarchy. For example, a hierarchical package identifier can indicate which packages are included within another package. For example a package identifier "pk1.pk2.pk3.cl1" can indicate that a first package (identifier "pk1") includes a second package (identifier "pk2"), which includes a third package (identifier "pk3") that contains a class identified by "cl1."

A method 500 for handling renamed packages can comprise detecting (act 410) an unknown referencing identifier and interrogating (act 415) an identifier map 131, as described above in connection with FIG. 4A. For packages, the identifier map 131 can be interrogated (act 515) to look for one or more non-canonical identifiers that match or partly match the detected referencing identifier. For example, a detected unknown package referencing identifier (e.g., "pk1.pk2.cl1") can be parsed by the renaming component 140, for example, into different referencing identifiers that are used when interrogating (act 515) the identifier map 131. In some implementations, a detected unknown package referencing identifier "pk1.pk2.cl1" can be parsed to first search the identifier map 131 and determine (act 520) whether the identifier map contains a matching non-canonical identifier matching an unknown parsed identifier for a packaged programming construct (e.g., an identifier for a packaged class "cl1") of the package referencing identifier. The parsed identifier can correspond to any packaged programming construct contained within a package and not only classes. If a match for the parsed identifier is found, then method 500 may continue with act 425 of FIG. 4A.

If a match for the parsed identifier of a packaged programming construct is not found, then it may be determined (act 530) whether a non-canonical identifier in the identifier map matches all or a portion of the unknown package referencing identifier "pk1.pk2.cl1." If it is determined (act 530) that there is no non-canonical identifier in the identifier map matching all or a portion of the unknown package referencing identifier, then execution of the code may end and an error issued (act 450).

According to some embodiments, act 530 can comprise searching the identifier map 131 using different portions of the unknown package referencing identifier in an order from most specific "pk1.pk2.cl1" to least specific "pk1". If any of the searches returns a match to the portion, then the associated canonical identifier is selected (act 534) for the unknown package referencing identifier and code execution resumes by proceeding to act 460 described in FIG. 4. As an example, a search of the identifier map 131 may return a match for the parsed identifier "pk2.cl1" and identify a renaming of the package pk2 (e.g., "pk2.cl1→newpk2.cl1"). In this example, a canonical identifier "pk1.newpk2.cl1" is selected for subsequent code execution.

By implementing the apparatus and methods above, a programming environment can handle seamlessly and without error code and data load operations in which programming constructs such as classes and packages have been renamed. The apparatus and methods provide forward and backward compatibility for code, and also support forward and backward compatibility for serialization of objects, such as data load operations. For example, when serializing an object associated with a programming construct, the mapping 200 can be parsed to determine whether there are one or more non-canonical identifiers for the programming construct. If one or more non-canonical identifiers exist, the object can be serialized using the oldest identifier. Accordingly, when the object is used in an oldest version of a programming environment, the oldest non-canonical identifier will be recognized, providing forward compatibility for the older programming environment. When the object is used in any more recent version of the programming environment, the oldest non-canonical identifier can resolve to a non-canonical identifier or canonical identifier used by the more recent version of the programming environment. If a new version of a programming environment is released that uses a new identifier for the referenced programming construct and the mapping 200 is updated to include the new name, then the oldest non-canonical identifier can resolve to the new name, providing backward compatibility for the newer programming environment.

In some systems, certain functions that reference programming constructs may need modification to execute properly. One example of such a function is an introspection function that is used to query whether an object is an instance of a certain type of class. An example introspection function is the "isa" function used in MATLAB®. The MATLAB "isa" function returns "true" if an object is an instance of a class specified by a class name or its superclass name, and returns "false" otherwise. In the presence of a renaming, the "isa" function would return false even though a construct could be an instance of queried class that has been renamed or superclass that has been renamed. Example introspection functions also include functions for obtaining class or package metadata, obtaining documentation for the class or package, and looking for a class or package's location on a path.

To adapt such a function to handle renamings of programming constructs, a method can be added to the function itself to issue a request to the renaming component 140, for example, as an additional check for a programming construct that may have been renamed. In some implementations, the function can be modified by adding lines of code to the function code that issues and request that initiates an interrogation of the identifier map 131 if an initial determination of "false" is made by the function. By doing an extra check in interrogating the identifier map 131, the "isa" function may be redirected to locate the renamed class using the canonical identifier and make a correct determination for the object. Providing support for introspection functions and other such functions in this manner can enable true equivalency between non-canonical and canonical identifiers for renamed programming constructs, which equivalency would not be possible with the use of typedefs in C or C++.

Various example workflows are possible with the systems and methods of the present disclosure. In one example workflow, a user can issue a command to invoke an introspection function on a programming construct (e.g., a class or package) using a non-canonical identifier. According to the above embodiments, a programming environment 102 can resolve the non-canonical identifier to a corresponding canonical identifier and execute the introspection function using the canonical identifier. Provided the programming construct is a valid member of a class or package, the programming environment can return relevant information to the user from the introspection function even though a non-canonical identifier was used to invoke the introspection function. In some embodiments, the return information identifies the programming construct or an instantiated object as being associated with the canonical identifier. In this way, the canonical identifier can be used internally as the canonical identifier for a programming construct, but the user can continue to use both the non-canonical and canonical identifiers interchangeably. Another example of equivalency would be to search for a graphical block by name (that has been renamed) using a block library search tool in a graphical programming environment such as Simulink®.

Figure 6:
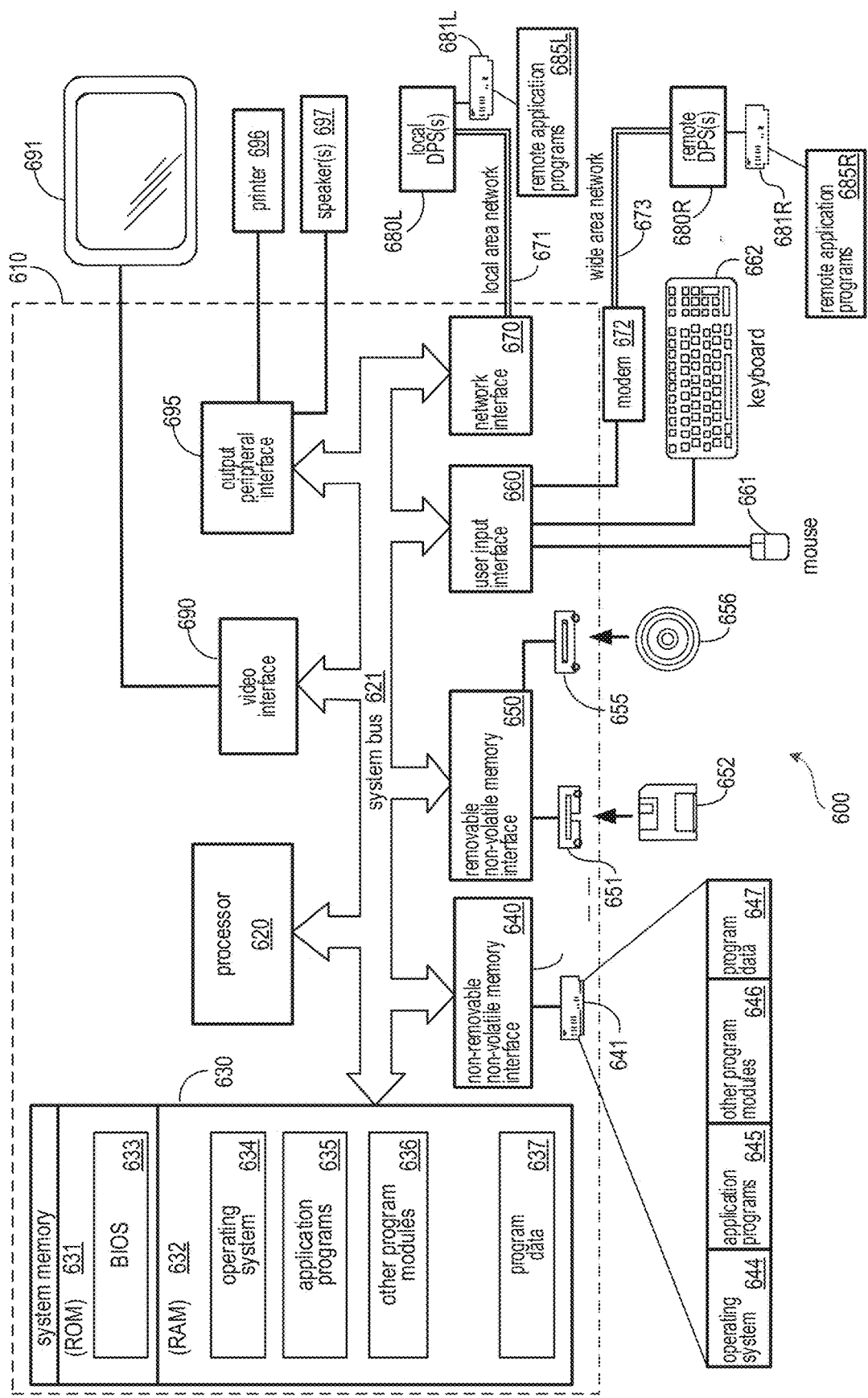
FIG. 6 depicts an example computing system that can support a programming environment of the present embodiments.

FIG. 6 depicts further details of a computing system that can be adapted to implement a programming environment 102 that handles renaming of programming constructs as described above. Some or all of the components shown may be present in a computing system of the present embodiments, for example. In a distributed computing environment, some components may be located on a server and some components may be located on a client device. In some embodiments, a system for implementing a programming environment 102 of the present embodiments can include a computing device 610 which can be embodied as a desktop computer, a workstation, or a laptop computer. Suitable workstations include Dell Precision series of workstations from Dell, Inc. of Round Rock, Tex., the HP Z400, Z600 and Z800 series of workstations from Hewlett Packard Co. of Palo Alto, Calif., among others. Other computing devices that may be used include palm computers and other portable computing devices, e.g., smart phones.

Components of computing device 610 can include, but are not limited to, a processor 620, a memory 630, and a bus 621 that couples various components including the memory to the processor 620. Example processors 620 include, but are not limited to, single or multicore processors, such as the Core™ Pentium®, or Celeron® families of processors from Intel Corp. of Santa Clara, Calif., or the Phenom, AMD Athlon or AMD Opteron families of processors from Advanced Micro Devices, Inc. of Sunnyvale, Calif., among others.

The bus 621 can be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computing device 610 can include one or more types of machine-readable media. Machine-readable media can be any available media that can be accessed by computing device 610 and includes both volatile and nonvolatile, manufactured storage media, removable and non-removable manufactured storage media. By way of example, and not limitation, machine-readable media may comprise information such as computer-readable code, data structures, program modules or other data. Machine-readable media includes, but is not limited to, RAM, ROM, EEPROM, flash memory or other memory-device technology, CD-ROM, digital versatile disks (DVD) or other optical disk storage, magnetic cassettes, magnetic tape, magnetic disk storage or other magnetic storage devices, or any other manufactured data-storage device which can be used to store the desired information and which can be accessed by computing device 610.

The memory 630 can include computer storage media in the form of volatile and/or nonvolatile memory such as read only memory (ROM) 631 and random access memory (RAM) 632. A basic input/output system 633 (BIOS), containing the basic routines that help to transfer information between elements within computing device 610, such as during start-up, may be stored in ROM 631. RAM 632 may contain data and/or program modules that are immediately accessible to and/or presently being operated on by processor 620. By way of example, and not limitation, FIG. 6 illustrates an operating system 634, application programs 635, other program modules 636, and program data 637.

The computing device 610 can also include other removable/non-removable, volatile/nonvolatile machine-readable media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile machine-readable media that can be used in the exemplary operating environment include, but are not limited to, magnetic tape cassettes, flash memory cards, digital versatile disks, digital video tape, solid state RAM, solid state ROM, and the like. The hard disk drive 641 may be connected to the system bus 621 through a non-removable memory interface such as interface 640, and magnetic disk drive 651 and optical disk drive 655 may be connected to the system bus 621 by a removable memory interface, such as interface 650.

The drives and their associated machine-readable media discussed above and illustrated in FIG. 6, provide storage of machine-readable code, data structures, program modules and other data for the computing device 610. In FIG. 6, for example, hard disk drive 641 is illustrated as storing operating system 644, application programs 645, other program modules 646, and program data 647. These components may either be the same as, or different from, operating system 634, application programs 635, other program modules 636, and program data 637. Operating system 644, application programs 645, other program modules 646, and program data 647 are given different numbers here to illustrate that, at a minimum, they are different copies.

A user can enter commands and information into the computing device 610 through input devices such as a keyboard 662 and pointing device 661, commonly referred to as a mouse, trackball or touch pad. Other input devices (not shown) can include a microphone, joystick, game pad, satellite dish, scanner, or the like. These and other input devices can be connected to the processor 620 through a user input interface 660 that is coupled to the system bus, but can be connected by other interface and bus structures, such as a parallel port, game port or a universal serial bus (USB). A monitor 691 or other type of display device can also be connected to the system bus 621 via an interface, such as a video interface 690. In addition to the monitor, a computing device 610 can also include other peripheral output devices such as speakers 697 and printer 696, which can be connected through an output peripheral interface 695.

The computing device 610 can operate in a networked environment using logical connections to one or more remote devices, such as a remote computer 680. The remote computer 680 may be a personal computer, a server, a router, a network PC, a peer device or other common network node, and may include many or all of the elements described above relative to the computing device 610, although only a memory storage device 681 has been illustrated in FIG. 6. The logical connections depicted in FIG. 6 include a local area network (LAN) 671 and a wide area network (WAN) 673, but may also include other networks. Such networking environments may be commonplace in offices, enterprise-wide computer networks, intranets and the Internet. Network connections can be wired, optical fiber based, or wireless.

When used in a LAN networking environment, the computing device 610 can be connected to the LAN 671 through a network interface or adapter 670. When used in a WAN networking environment, the computing device 610 may include a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computing device 610, or portions thereof, may be stored in a remote memory storage device. By way of example, and not limitation, FIG. 6 illustrates remote application programs 685 as residing on memory device 681. It will be appreciated that the network connections shown are exemplary and other means of establishing a communications link between the computers may be used.

Providing backward and forward compatibility of code or data that references a renamed programming construct in a programming environment can be implemented in various configurations. Example configurations include combinations of method configurations (1) through (16) as described below.

(1) A method of providing backward and forward compatibility of code or data that references a renamed programming construct, the method comprising: detecting, by a processor of a computing system, a first mapping between one or more non-canonical identifiers for a programming construct and a canonical identifier for the programming construct, the first mapping being stored in source code, metadata associated with source code, or object code; parsing the first mapping; generating an identifier map based at least in part on information parsed from the first mapping, wherein the identifier map includes at least the canonical identifier and associates the canonical identifier with the one or more non-canonical identifiers; at run-time of the code or load operation of the data, detecting an unknown referencing identifier for a programming construct; in response to detecting the unknown referencing identifier, accessing the identifier map; determining from the identifier map that a non-canonical identifier of the one or more non-canonical identifiers matches the unknown referencing identifier and is associated with the canonical identifier; and executing the code using the canonical identifier without entering an error state.

(2) The method of (1), wherein at least a portion of the identifier map is written in cache.

(3) The method of (1) or (2), wherein the programming construct is a class or package.

(4) The method of any one of (1) through (3), wherein the act of executing the code requires no intervention by a user.

(5) The method of any one of (1) through (3), wherein act of executing the code comprises replacing, in the code, the unknown referencing identifier with the canonical identifier or generating a code part that replicates a portion of the code with the unknown referencing identifier replaced by the canonical identifier.

(6) The method of any one of (1) through (5), wherein a version of a programming environment that executes the code is a version that predates or postdates renaming of the programming construct from the non-canonical identifier to the canonical identifier.

(7) The method of any one of (1) through (3), further comprising: identifying a duplicate identifier that is lexically identical to the non-canonical identifier and in use for code execution; and selecting the duplicate identifier or the canonical identifier for executing the code based, at least in part, on a programming environment variable.

(8) The method of any one of (1) through (7), wherein the act of parsing comprises identifying, from the first mapping, information indicating that the non-canonical identifier used for the programming construct is older than the canonical identifier.

(9) The method of any one of (1) through (7), wherein the act of parsing comprises identifying a chronological order associated with one or more non-canonical identifiers.

(10) The method of any one of (1) through (9), further comprising: receiving a code part to serialize an object that belongs to a class that is referenced by the canonical identifier; and serializing the object using an oldest related non-canonical identifier of the one or more non-canonical identifiers for the class.

(11) The method of any one of (1) through (10), wherein the acts of detecting and parsing execute in response to a path-change event.

(12) The method of any one of (1) through (11), further comprising invalidating at least one entry in the identifier map in response to a path-change event.

(13) The method of any one of (1) through (12), wherein the programming construct is a class that is referenced by the canonical identifier, the method further comprising: receiving a query using the non-canonical identifier whether an object is an instance of the class that is referenced by the canonical identifier; and returning an indication that the object is an instance of the class.

(14) The method of any one of (1) through (13), further comprising: in response to a path-change event, detecting, by the processor, a second mapping between one or more second non-canonical identifiers for a second programming construct and a second canonical identifier for the second programming construct, the second mapping being stored in source code, metadata associated with source code, or object code; parsing the second mapping; and editing the identifier map to include the second canonical identifier and associate the second canonical identifier with the one or more second non-canonical identifiers.

(15) A computing system that supports a programming environment, the system comprising: at least one processor in communication with first memory and rapid access memory; code-execution components; an aliasing parser; and a path manager, the programming environment configured to: detect, by the aliasing parser, a first mapping between one or more non-canonical identifiers for a programming construct and a canonical identifier for the programming construct, the first mapping being stored in source code, metadata associated with source code, or object code in the first memory; parse, by the aliasing parser, the first mapping; generate an identifier map in the rapid access memory based at least in part on information parsed from the first mapping, wherein the identifier map includes at least the canonical identifier and associates the canonical identifier with the one or more non-canonical identifiers; at run-time of code or load operation of data in the programming environment, detect, by at least one of the code-execution components, an unknown referencing identifier for a programming construct; in response to detecting the unknown referencing identifier, initiate interrogation of the identifier map; identify from the identifier map that a non-canonical identifier of the one or more non-canonical identifiers matches the unknown referencing identifier and is associated with the canonical identifier; and execute, by the code-execution components, the code without entering an error state.

Features in configurations (2) through (14) may be combined with configuration (15).

(16) Computer-readable medium encoding code that, when executed by at least one processor of a computing system, adapt the at least one processor to: detect a mapping between one or more non-canonical identifiers for a programming construct and a canonical identifier for the programming construct, the mapping being stored in source code, metadata associated with source code, or object code; parse the mapping; generate an identifier map based at least in part on information parsed from the mapping, wherein the identifier map includes at least the canonical identifier and associates the canonical identifier with the one or more non-canonical identifiers; at run-time of code or load operation of data, detect an unknown referencing identifier for a programming construct; in response to detecting the unknown referencing identifier, access the identifier map; determine from the identifier map that a non-canonical identifier of the one or more non-canonical identifiers matches the unknown referencing identifier and is associated with the canonical identifier; and execute the code without entering an error state.

Features in configurations (2) through (14) may be combined with configuration (16).

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

The section headings used herein are for organizational purposes only and are not to be construed as limiting the subject matter described in any way.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A method of providing backward and forward compatibility of code or data that references a renamed programming construct, the method comprising:
   detecting, by a processor of a computing system, a first mapping between one or more non-canonical identifiers for a programming construct and a canonical identifier for the programming construct, the first mapping being stored in source code, metadata associated with source code, or object code;
   parsing the first mapping;
   generating an identifier map based at least in part on information parsed from the first mapping, wherein the identifier map includes at least the canonical identifier and associates the canonical identifier with the one or more non-canonical identifiers;
   at run-time of the code or load operation of the data, detecting an unknown referencing identifier for the programming construct;
   in response to detecting the unknown referencing identifier;
     accessing the identifier map;
     determining from the identifier map that a non-canonical identifier of the one or more non-canonical identifiers matches the unknown referencing identifier and is associated with the canonical identifier; and
     executing the code using the canonical identifier without entering an error state,
     wherein the act of executing the code comprises replacing, in the code, the unknown referencing identifier with the canonical identifier or generating a code Dart that replicates a portion of the code with the unknown referencing identifier replaced by the canonical identifier or redirecting a code reference to the programming construct from the unknown referencing identifier to the canonical identifier, and
     wherein a version of a programming environment that executes the code is a version that predates or postdates renaming of the programming construct from the non-canonical identifier to the canonical identifier.

2. The method of claim 1, wherein at least a portion of the identifier map is written in cache.

3. The method of claim 1, wherein the programming construct is a class, a package, or a function.

4. The method of claim 1, wherein the act of executing the code requires no intervention by a user.

5. The method of claim 1, further comprising:
   identifying a duplicate identifier that is lexically identical to the non-canonical identifier and in use for code execution; and
   selecting the duplicate identifier or the canonical identifier for executing the code based, at least in part, on a programming environment variable.

6. The method of claim 1, wherein the act of parsing comprises identifying, from the first mapping, information indicating that the non-canonical identifier used for the programming construct is older than the canonical identifier.

7. The method of claim 1, wherein the act of parsing comprises identifying a chronological order associated with one or more non-canonical identifiers.

8. The method of claim 1, further comprising:
   receiving a code part to serialize an object that belongs to a class that is referenced by the canonical identifier; and
   serializing the object using an oldest related non-canonical identifier of the one or more non-canonical identifiers for the class.

9. The method of claim 1, wherein the acts of detecting and parsing execute in response to a path-change event.

10. The method of claim 1, further comprising invalidating at least one entry in the identifier map in response to a path-change event.

11. The method of claim 1, wherein the programming construct is a class that is referenced by the canonical identifier, the method further comprising:
   receiving a query using the non-canonical identifier whether an object is an instance of the class that is referenced by the canonical identifier; and
   returning an indication that the object is an instance of the class.

12. The method of claim 1, further comprising:

in response to a path-change event, detecting, by the processor, a second mapping between one or more second non-canonical identifiers for a second programming construct and a second canonical identifier for the second programming construct, the second mapping being stored in source code, metadata associated with source code, or object code;

parsing the second mapping; and editing the identifier map to include the second canonical identifier and associate the second canonical identifier with the one or more second non-canonical identifiers.

13. The method of claim 1, wherein the first mapping is detected, and/or the identifier map is generated based on the first mapping, by an aliasing parser implemented on the processor.

14. The method of claim 1, wherein the first mapping is updated based on mapping information received from a user via a user interface.

15. The method of claim 14, wherein updating the first mapping includes creating, modifying, and/or deleting at least a portion of the first mapping based on the mapping information.

16. The method of claim 14, wherein the mapping information includes an updated canonical identifier associated with the non-canonical identifier for the programming construct.

17. A computing system that supports a programming environment, the system comprising:

at least one processor in communication with first memory and rapid access memory;

code-execution components;

an aliasing parser; and a path manager, the programming environment configured to:

detect, by the aliasing parser, a first mapping between one or more non-canonical identifiers for a programming construct and a canonical identifier for the programming construct, the first mapping being stored in source code, metadata associated with source code, or object code in the first memory;

parse, by the aliasing parser, the first mapping;

generate an identifier map in the rapid access memory based at least in part on information parsed from the first mapping, wherein the identifier map includes at least the canonical identifier and associates the canonical identifier with the one or more non-canonical identifiers;

at run-time of code or load operation of data in the programming environment, detect, by at least one of the code-execution components, an unknown referencing identifier for the programming construct;

in response to detecting the unknown referencing identifier:

initiate interrogation of the identifier map;

identify from the identifier map that a non-canonical identifier of the one or more non-canonical identifiers matches the unknown referencing identifier and is associated with the canonical identifier; and execute, by the code-execution components, the code without entering an error state, wherein the act of executing the code comprises replacing, in the code, the unknown referencing identifier with the canonical identifier or generating a code Dart that replicates a portion of the code with the unknown referencing identifier replaced by the canonical identifier or redirecting a code reference to the programming construct from the unknown referencing identifier to the canonical identifier, and wherein a version of a programming environment that executes the code is a version that predates or postdates renaming of the programming construct from the non-canonical identifier to the canonical identifier.

18. The system of claim 17, wherein the programming construct is a class, a package, or a function.

19. A non-transitory computer-readable medium encoding code that, when executed by at least one processor of a computing system, adapt the at least one processor to:

detect a mapping between one or more non-canonical identifiers for a programming construct and a canonical identifier for the programming construct, the mapping being stored in source code, metadata associated with source code, or object code;

parse the mapping;

generate an identifier map based at least in part on information parsed from the mapping, wherein the identifier map includes at least the canonical identifier and associates the canonical identifier with the one or more non-canonical identifiers;

at run-time of code or load operation of data, detect an unknown referencing identifier for the programming construct;

in response to detecting the unknown referencing identifier:

access the identifier map;

determine from the identifier map that a non-canonical identifier of the one or more non-canonical identifiers matches the unknown referencing identifier and is associated with the canonical identifier; and execute the code without entering an error state, wherein the act of executing the code comprises replacing, in the code, the unknown referencing identifier with the canonical identifier or generating a code part that replicates a portion of the code with the unknown referencing identifier replaced by the canonical identifier or redirecting a code reference to the programming construct from the unknown referencing identifier to the canonical identifier, and wherein a version of a programming environment that executes the code is a version that predates or postdates renaming of the programming construct from the non-canonical identifier to the canonical identifier.

20. The non-transitory computer-readable medium of claim 19, wherein the programming construct is a class, a package, or a function.

* * * * *

UNITED STATES PATENT AND TRADEMARK OFFICE
CERTIFICATE OF CORRECTION

PATENT NO. : 10,649,744 B1  
APPLICATION NO. : 16/206917  
DATED : May 12, 2020  
INVENTOR(S) : Jennifer Black et al.

Page 1 of 1

It is certified that error appears in the above-identified patent and that said Letters Patent is hereby corrected as shown below:

In the Claims

At Column 26, Claim 1, Line 5, the word "identifier;" should be removed and the correction should read as follows: --identifier:--.

At Column 26, Claim 1, Line 18, the word "Dart" is incorrect and should be corrected to read as follows: --part--.

At Column 28, Claim 17, Line 6, the word "Dart" is incorrect and should be corrected to read as follows: --part--.

Signed and Sealed this  
Fourteenth Day of July, 2020

Andrei Iancu  
*Director of the United States Patent and Trademark Office*